US008954371B2

(12) United States Patent
Dresdner et al.

(10) Patent No.: US 8,954,371 B2
(45) Date of Patent: Feb. 10, 2015

(54) SYSTEMS AND/OR METHODS FOR DYNAMIC SELECTION OF RULES PROCESSING MODE

(75) Inventors: Barry S. Dresdner, Herndon, VA (US); Son T. Nguyen, Germantown, MD (US)

(73) Assignee: Software AG USA, Inc., Reston, VA (US)

( * ) Notice: Subject to any disclaimer, the term of this patent is extended or adjusted under 35 U.S.C. 154(b) by 263 days.

(21) Appl. No.: 13/524,360

(22) Filed: Jun. 15, 2012

(65) Prior Publication Data

US 2013/0339285 A1 Dec. 19, 2013

(51) Int. Cl.
*G06F 17/00* (2006.01)
*G06N 5/02* (2006.01)

(52) U.S. Cl.
CPC ........................................ *G06N 5/02* (2013.01)
USPC .......................................................... 706/47

(58) Field of Classification Search
None
See application file for complete search history.

(56) References Cited

U.S. PATENT DOCUMENTS

| 6,968,328 | B1 * | 11/2005 | Kintzer et al. ................... 706/45 |
| 7,020,869 | B2 * | 3/2006 | Abrari et al. ................... 717/108 |
| 7,340,406 | B1 * | 3/2008 | Tribble .......................... 705/7.36 |
| 8,073,801 | B1 * | 12/2011 | von Halle et al. ............... 706/47 |

OTHER PUBLICATIONS

Eager, Angela. "FICO Blaze Advisor 6.7." (2009).*
Vincent, Paul D. "Fair Isaac Blaze Advisor Structured Rules Language-a commercial rules representation." Rule Languages for Interoperability. 2005.*
Nagl, Christoph, Florian Rosenberg, and Schahram Dustdar. "VIDRE—A Distributed Service-Oriented Business Rule Engine based on RuleML." Enterprise Distributed Object Computing Conference, 2006. EDOC'06. 10th IEEE International. IEEE, 2006.*
Barbara von Halle et al., "The Business Rule Revolution," Chapter 4, pp. 59-78, Copyright Happy About 2006.
Jerome Boyer et al., "Agile Business Rule Development: Process, Architecture, and JRules Examples," Copyright Springer 2011.
Frank Olken et al., "Rule-Based Modeling and Computing on the Semantic Web," Copyright Springer 2011.
FICO TM Blaze Advisor R Enterprise Edition Business Rules Management System. [Retrieved Aug. 28, 2012] http://www.fico.com/_LAYOUTS/1033/FICO/MasterPages/Scripts/elqNow/elqRedir.htm?ref=http://www.fico.com/en/FIResourcesLibrary/FICO_Blaze_Advisor_Enterprise_Edition_2741PS.pdf.
IBM—WebSphere ILOG JRules Business Rule Management System (BRMS). [Retrieved Aug. 28, 2012] http://www-01.ibm.com/software/integration/business-rule-management/jrules-family/.

(Continued)

*Primary Examiner* — Kakali Chaki
*Assistant Examiner* — Daniel Pellett
(74) *Attorney, Agent, or Firm* — Nixon & Vanderhye PC

(57) ABSTRACT

Certain example embodiments described herein relate to techniques for dynamically selecting rule processing modes. The processing mode does not need to be specified during rule design/authoring. Two sets of artifacts may be generated to support a desired processing mode. This may occur in the designer's local workspace, e.g., so that rule invocation can be tested locally. Additionally, or alternatively, both sets of artifacts may be installed on the rule engine running on a remote server when the project is deployed. The designer need not be aware that both sets of artifacts are being generated. In certain example embodiments, the designer may have the ability to sequence rules within metaphors (or decision entities such as decision tables), and/or the ability to sequence metaphors within rule sets. During rule invocation, a parameter may be provided to indicate the processing mode (e.g., sequential or inferential) to be used by the rule engine.

32 Claims, 11 Drawing Sheets

(56) References Cited

OTHER PUBLICATIONS

IBM—Operational Decision Management. [Retrieved Aug. 28, 2012] http://www-01.ibm.com/software/decision-management/operational-decision-management/websphere-operational-decision-management/about/?S_CMP=wspace&S_CMP=wspace.

DTRules: A Java Based Decision Table Rules Engine. [Retrieved Aug. 28, 2012] http://www.dtrules.com/newsite/.

RedHat—JBoss Enterprise Business Management System (BRMS). [Retrieved Aug. 28, 2012] http://www.redhat.com/products/jboss-senterprisemiddleware/business-rules/#.

* cited by examiner

SYSTEMS AND/OR METHODS FOR DYNAMIC SELECTION OF RULES PROCESSING MODE

FIELD OF THE INVENTION

Certain example embodiments described herein relate to techniques for dynamically selecting a rules processing mode. More particularly, certain example embodiments described herein relate to techniques for configuring and/or operating a Business Rules Management System (BRMS) in which rules processing modes are not specified at design time and instead are optionally passed as parameters during rule invocation, thereby enabling the dynamic selection of a rules processing mode and the dynamic invocation of a proper rule module in a manner that is independent from other peer rule modules that operate in accordance with alternate processing modes.

BACKGROUND AND SUMMARY OF EXAMPLE EMBODIMENTS OF THE INVENTION

Business rules are statements that define or constrain some aspect of a business. They can have one or more conditions that resolve to either true or false, and one or more actions that can be performed. The actions may be performed if all conditions are satisfied by external data provided as facts. A fact is basically a set of data that conforms to a given structure. In business terms, the structure may comprise such objects as a purchase order record, a customer record, credit card information, etc. Business rules typically are intended to assert business structure or to control or influence the behavior of the business. Business rules thus may be thought of as describing the operations, definitions, and constraints that apply to an organization. It will be appreciated that business rules may apply to people, processes, corporate behavior, and/or computing systems in and/or across one or more organizations, and may be put in place to help the organization(s) achieve its/their goals.

In the context of a Business Rules Management System (BRMS), for example, business rules are user-defined statements that typically reside within rule engines. A rules engine typically is a software and/or hardware system that is configured to execute one or more business rules in a runtime production environment. Business rules in the BRMS context generally are formalized so that they left-hand sides that test for various conditions of elements within predefined data structures, and right-hand sides that perform various operations. These operations may include, for example, modifying data elements of the predefined data structures, invoking web services, sending email notifications, and/or the like. As facts (e.g., data that correspond to the predefined structures) are asserted into the rule engines, they typically are evaluated by the left-hand sides (LHSs) of the rules and, if the conditions are satisfied, the right-hand sides (RHSs) of the rules are triggered. Thus, the LHS part of a rule represents the "if" part(s) that include the conditions that test data elements, whereas the RHS of a rule represents the "then" part(s) and indicates what actions, if any, result when the LHS evaluates to true.

The majority of current, commercially available rule engines support inferential processing of the rules. Others additionally support sequential processing. See, for example, Frank Olken et al., eds., *Rule-based Modeling and Computing on the Semantic Web*, Springer Press (2011). With inferential processing, rules are evaluated in no particular order and, thus, inferential processing supports a pure declarative representation of business rules. Modification of data elements by the right-hand side of a rule can cause other rules to be evaluated and potentially fired when their left-hand sides test the same values that have been changed. By contrast, sequential processing involves a rule order to be specified (e.g., by a user) and, in most currently available products, reevaluation of rules will not occur when data elements are modified by the right-hand sides. Thus, in sequential processing, rules within a decision table (discussed below) can be ordered sequentially and, at runtime, will be evaluated in the specified order. Metaphors (e.g., easy to understand representations of sets of rules such as, for example, decision tables, decision trees, etc.) within a rule set can also be ordered sequentially.

Some engines have additional processing modes, such as IBM's WebSphere ILOG JRules. This engine offers a Fastpath mode that is an augmented sequential compilation and execution of a rule project. See also Jérôme Boyer and Hafedh Mili, *Agile Business Rule Development: Process, Architecture, and JRules Examples*, Springer Press (2011), discussing in detail the sequential and Fastpath algorithm used by JRules, and explaining how to determine which processing mode (inferential, sequential, Fastpath) is best for a given rule application. Other vendors/rule engine combinations include, for example, Fair Isaac Corp.'s Blaze Advisor, Apache Open Source's DTRules, and Red Hat's JBoss Drools.

It is believed that the state of the art related to business rule technology is changing, e.g., to provide different modes of engine execution. Historically, inference execution mode has dominated the technology. For example, the Rete algorithm (which is an efficient pattern matching algorithm for implementing production rule systems) has been widely used among rule engine vendors to support rule execution and inference processing. Authoring rules was primarily performed with inferential processing in mind, and there was no way to specify any other type of execution. Today, rule engine vendors are supporting sequential processing.

Sequential processing may be supported in a number of different ways. In a first approach, using salience, a priority is placed on rules within an inference based engine. In a second approach, a framework is built around the engine that captures facts before they are asserted into the Rete-based engine. The rules are then evaluated sequentially using a separate algorithm. See also Barbara von Halle and Larry Goldberg, eds., *Business Rule Revolution: Running Business the Right Way*, Happy About (2006), noting that sequential processing has recently been adopted by rule engine vendors, and that sequential processing sometimes bypasses the Rete algorithm that emulates event-based processing while at the same time significantly increasing performance.

The inventors of the instant application have noticed a common trend among currently available products and approaches. In particular, the processing mode must be specified when authoring the business rules. In most cases, the default mode is inferential. However, if sequential is desired, it must be specified during design. When the processing mode is specified during design time, the rules and other necessary artifacts are generated to support only that mode. Thus, it will be appreciated that currently available products seem to be limited in the sense that the execution mode must be specified at design time, and once the mode has been set, it cannot be changed during rule invocation (e.g., at runtime).

Unfortunately, however there are disadvantages associated with requiring that the processing mode only be specified during rule authoring/design. A first disadvantage relates to the fact that rules generally are grouped on their own individually or within metaphors such as decision tables or decision trees. These metaphors themselves can be grouped within rule sets. Internally, the individual rules, metaphors, and rule sets are maintained within rule modules. These modules can be invoked independently from external applications.

Assume the following facts for the purposes of explanation. Consider that a rule module (RuleModuleA) has been authored, and is resident within a rule base for a given rule engine, RuleModuleA is invoked by 100 different external applications. RuleModuleA was authored to be processed sequentially. Now, one of the external application users has determined that it would be better if the rules within their decision table or rule set were executed inferentially. If the processing mode of the decision table or rule set is modified to support this one external application, it will potentially break the other 99 external applications.

It will be appreciated that duplication of effort is required to support two different external applications that require the same set of rules, where one decision table or rule set is required to be processed inferentially and the other sequentially. FIG. 1 illustrates a decision table (DecisionTableA) being saved as a rule module (RuleModuleA). A decision table is a precise yet compact way of representing conditional logic, and it is well suited to business level rules. A decision table may be thought of as being similar to an Excel spreadsheet, where conditions are specified as LHS columns and actions are specified as RHS columns and where each row in the table represents a separate rule. A rule module is a contained set of rules and instructions, and rule modules typically are insulated from other modules. As shown in FIG. 1, within the design/authorizing environment, DecisionTableA is saved as RuleModuleA, which is either inferential or sequential, but not both.

After authoring, RuleModuleA is deployed to the runtime environment that hosts the rule engine. Deployment places the rule module into a rule base, as well as into the rule engine. The rule base is a repository where rules are stored for a given rule engine. FIG. 2 illustrates how external applications invoke RuleModuleA from FIG. 1 in an illustrative runtime environment. The external applications generally are not aware of the underlying modules and instead only know about the metaphors or rule sets. An invocation layer directs their requests to the right module. Since Appl1, Appl2, and Appl3 all invoke DecisionTableA (RuleModuleA), they will all be affected if the processing mode for the module is changed from sequential to inferential, or vice versa.

Thus, it will be appreciated that there is a need in the art for systems and/or methods that overcome these and/or other disadvantages, thereby reducing the need for the rule designer to specify a particular processing mode at design time.

One aspect of certain example embodiments relates to enabling rule designers to specify a particular processing mode at runtime by, for example, optionally passing the processing mode as a parameter during rule invocation. A default processing mode can be utilized in certain example embodiments, e.g., where no processing mode parameter is passed. This approach may in certain example embodiments free designers from having to tie invocations to a particular processing mode at design time.

In accordance with certain example embodiments, a method of configuring a business rules management system (BRMS) including a business rule engine that executes one or more business rules in a runtime environment is provided. User input indicating that at least one rule metaphor is to be created is received in connection with a user interface operating on a computer, with each said rule metaphor including a representation of a set of rules. At least two metaphor rule modules for each said rule metaphor are generated via at least one processor, with the metaphor rule modules for a given one rule metaphor respectively supporting different ways the set of rules represented therein can be invoked at runtime. User input indicating that at least one rule set is to be created is received in connection with a or the user interface operating on a or the computer, with each said rule set being associated with at least one created rule metaphor. At least two rule set rule modules for the at least one rule set are generated via at least one processor, with the rule set rule modules for a given one rule set respectively supporting different ways that rule set can be invoked at runtime.

In accordance with certain example embodiments, there is provided a method of operating a business rules management system (BRMS) including a business rule engine that is configured to execute one or more business rules in a runtime environment. The rule engine includes plural invokable rule modules provided to handle different respective invocation types for an associated predefined rule module. A request to invoke a predefined rule module stored in the rule engine, at least one fact and/or an indication of at least one fact that is needed by the rule engine in invoking the requested predefined rule module, and an indication of an invocation type for the requested predefined rule module, are received from an application. It is determined which invokable rule module associated with the requested predefined rule module should be invoked based on the received indication of the invocation type. The invokable rule module is invoked, in connection with at least one processor of the BRMS, in dependence on this determination. Output from the rule engine is output to the application.

In certain example embodiments, non-transitory computer readable storage media tangibly store instructions that, when executed by at least one processor of a computer, may perform one of these and/or other configuration and/or operation methods.

Similarly, in certain example embodiments, a computer system including at least one processor and a memory may be configured to execute these configuration and/or operation instructions (e.g., as stored on the non-transitory computer readable storage medium(s)).

In accordance with certain example embodiments, a computer system for configuring a business rules management system (BRMS) including a business rule engine that executes one or more business rules in a runtime environment is provided. A user interface is configured to receive user input indicating that (a) at least one rule metaphor is to be created, each said rule metaphor including a representation of a set of rules, and (b) at least one rule set is to be created, each said rule set being associated with at least one created rule metaphor. At least one processor is configured to generate: at least two metaphor rule modules for each said rule metaphor, the metaphor rule modules for a given one rule metaphor respectively supporting different ways the set of rules represented therein can be invoked at runtime; and at least two rule set rule modules for the at least one rule set, the rule set rule modules for a given one rule set respectively supporting different ways that rule set can be invoked at runtime.

In accordance with certain example embodiments, a business rules management system (BRMS) is provided. Processing resources include at least one processor and a memory. A business rule engine is configured to execute, in connection with the processing resources, one or more business rules in a runtime environment, with the rule engine including plural invokable rule modules provided to handle different respective invocation types for an associated predefined rule module. A network interface is configured to receive, from an application, a request to invoke a predefined rule module stored in the rule engine, at least one fact and/or an indication of at least one fact that is needed by the rule engine in invoking the requested predefined rule module, and an indication of an invocation type for the requested predefined rule module. The processing resources are configured to at least: determine which invokable rule module associated with the requested predefined rule module should be invoked based on the received indication of the invocation type; invoke the invokable rule module in dependence on the determination; and cause output from the rule engine to be transmitted to the application over the network interface.

While the above description focuses on business rules and corresponding Business Rules Management Systems (BRMSs), it will be appreciated that example embodiments of the present invention are not limited to business aspects. Rather, one skilled in the art will appreciate that rule management systems (RMSs) are quite extensively employed in a number of technical applications. Examples include the controlling and monitoring the correct behavior of distributed computing systems (e.g., service-oriented architectures (SOA) or event-driven systems), the management of a computer-controlled assembly line in a factory, and/or the like. Thus, it will be appreciated that certain example embodiments disclosed herein are equally applicable to such technical rule-based environments.

These features, aspects, advantages, and example embodiments may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION OF EXAMPLE EMBODIMENTS OF THE INVENTION

Certain example embodiments allow rule designers to create rule modules without specifying a processing mode when authoring them. Users can still sequence rules within a decision table or decision tables within a rule set in a given order with the foresight that a sequential invocation will provide certain benefits to the caller, but sequencing is not required. In certain example implementations, users can specify a processing mode during design, but this mode may in such cases be used only as the default mode during rule invocation. According to certain example embodiments, users who want to invoke rule modules from external applications may specify a parameter that will be passed to the rule engine framework along with the required fact(s) during invocation, with the parameter indicating the processing mode (e.g., inferential, sequential, other). If a default processing mode was used during design, then no parameter needs to be passed, and the default mode may be executed during invocation. It will be appreciate that using such techniques, if there are 100 external applications that all invoke the same rule set and one of them needs to change its processing mode, it can do so by simply setting the parameter and without affecting other external applications.

In certain example embodiments, during design, rules and related artifacts may be generated during creation of rule metaphors, e.g., to support the different processing modes (e.g., inferential, sequential, other). In some cases, they may be generated independently of each other and included within separate modules.

In most business rules development environments, the rule engine resides on a server that is separate from the workspace where the rule metaphors are created. There is usually a deployment process that is leveraged to put the generated rules and their modules into the rule base on the server with the rule engine. The deployment mechanism may copy over the local modules, and/or it may create them on the server with the rule engine.

Upon invocation, the rule engine framework may evaluate the parameter. The facts may be directed to the Rete agenda when the engine is to be run inferentially (e.g., as specified by the parameter or by default), or the facts may be acted on by the procedural set of instructions when the engine is to be run sequentially (e.g., as specified by the parameter or by default). In certain example embodiments, the sequential rules may simply be a procedural set of instructions that are not asserted into the Rete agenda. It is noted that an agenda may be thought of as being a prioritized queue of rule right-hand sides for a rule engine that are waiting to fire.

Figure 1:
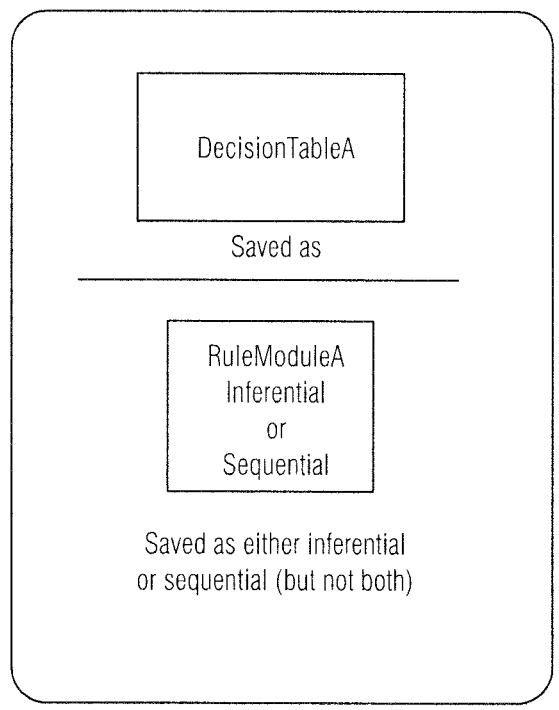
FIG. 1 illustrates a decision table (DecisionTableA) being saved as a rule module (RuleModuleA)
Figure 2:
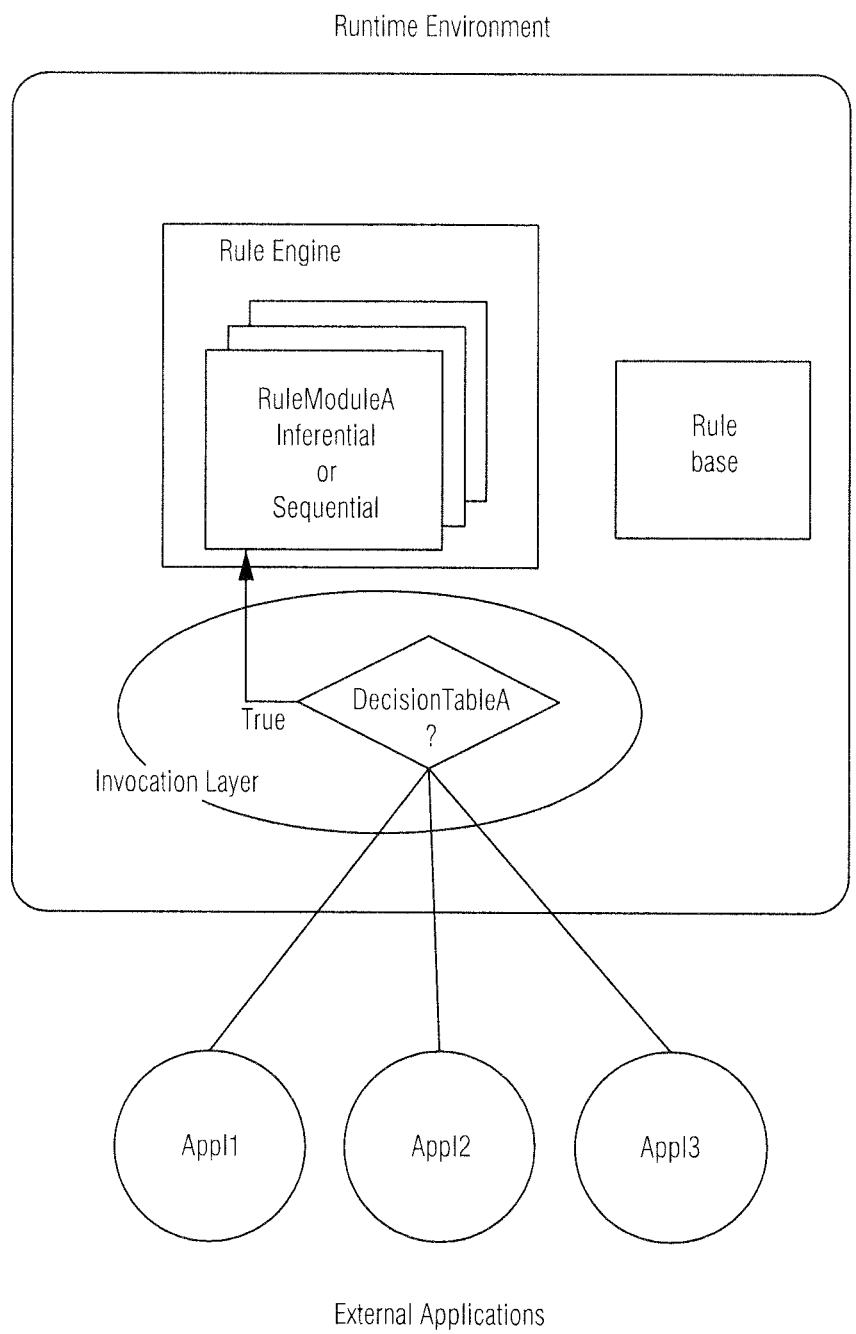
FIG. 2 illustrates how external applications invoke RuleModuleA from FIG. 1 in an illustrative runtime environment.
Figure 3:
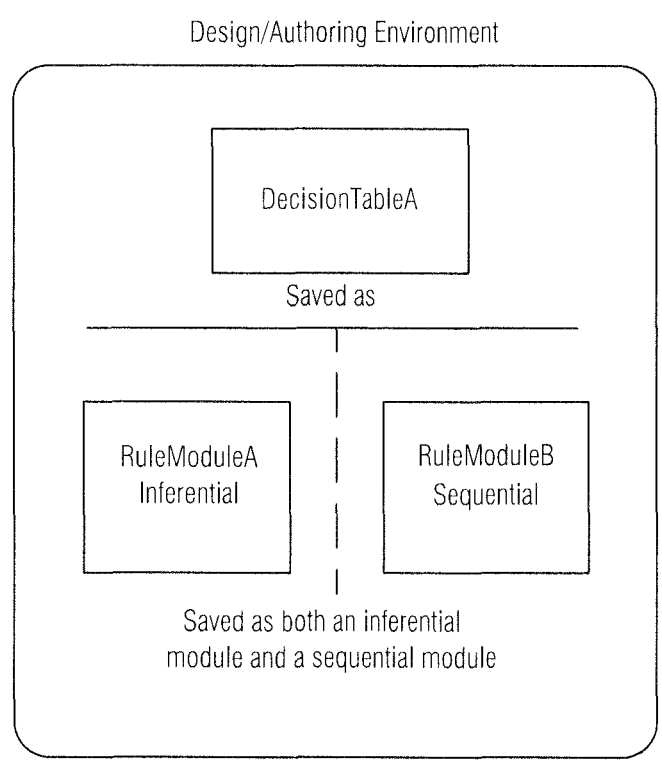
FIG. 3 is an illustrative design/authoring environment in accordance with certain example embodiments.

FIG. 3 is an illustrative design/authoring environment in accordance with certain example embodiments. As shown in FIG. 3, DecisionTableA is created and saved. The user is not required to specify a processing mode. The user may nonetheless still have the ability to sequence rules within the decision table. Upon saving, two separate rule modules are created—RuleModuleA (which supports inferential processing) and RuleModuleB (which supports sequential processing).

It will be appreciated that the modules do not need to be created at the time of saving in all example embodiments. Instead, saving may in certain example implementations simply create a configuration file for the decision table. Thus, the modules can be generated within the runtime environment at the time of deployment. Some authoring environments may support local testing of the rules, e.g., as enabled by the local creation of the modules upon saving.

Figure 4:
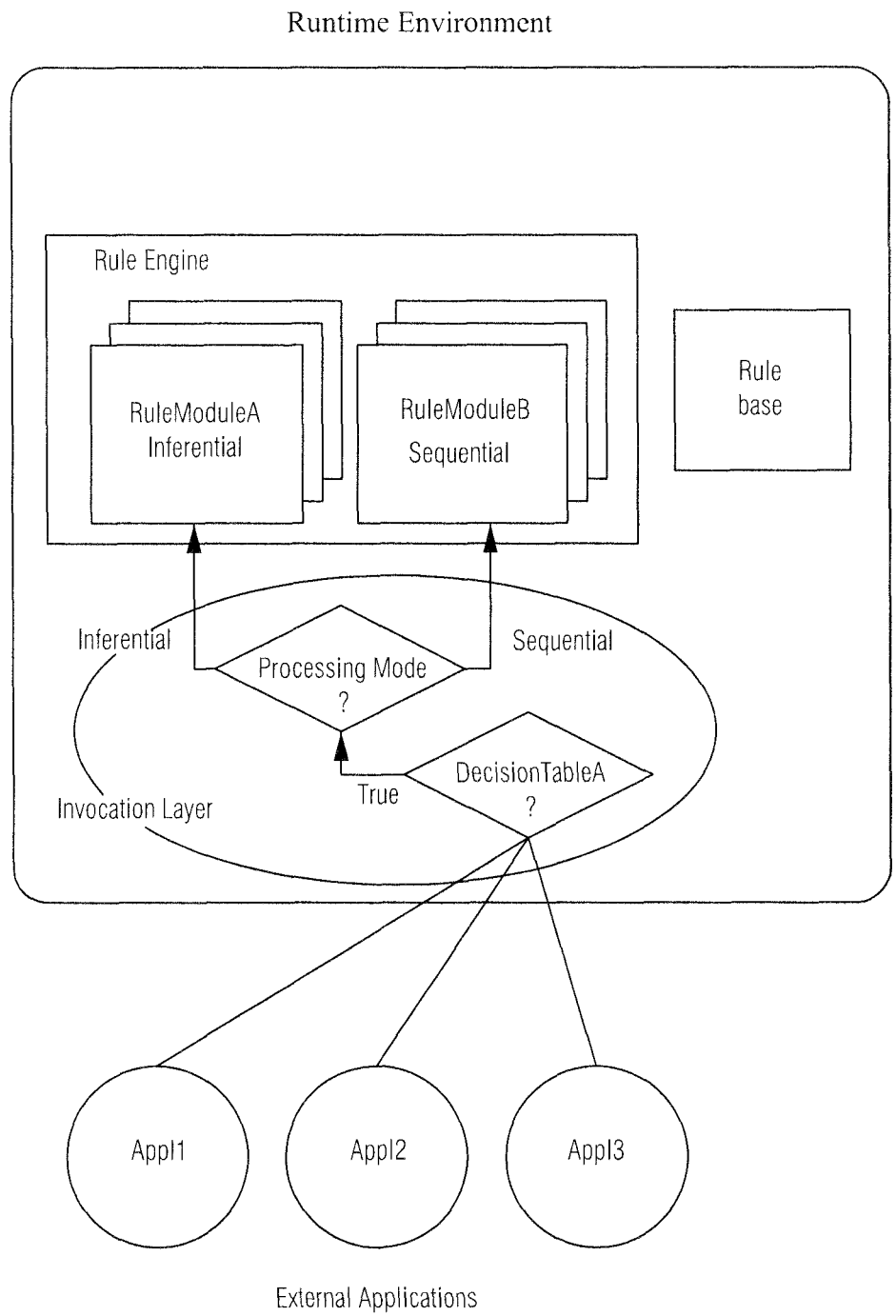
FIG. 4 shows how the proper modules are invoked at runtime with the inclusion of a processing mode parameter provided by the external applications in accordance with certain example embodiments.

FIG. 4 shows how the proper modules are invoked at runtime with the inclusion of a processing mode parameter provided by the external applications in accordance with certain example embodiments. External applications indicate which decision table or rule set is to be invoked and specifies the processing mode. This information may be specified within a header section of a payload that is provided to the invocation layer by the external application in certain example embodiments. The payload may also include the facts that are to be processed, and/or at least an indication thereof (such as, for example, a pointer thereto, unique identifier thereof, etc.). The invocation layer of the runtime environment may examine the header information and, based on the facts to be processed and the indication of the processing mode to be used, the corresponding rule module is executed.

If the sequential processing mode is desired, additional parameters optionally can be provided to control the sequential behavior. For instance, additional information may include flags that can cause processing to stop when the first rule that satisfies the conditions is found and triggered or to cause all rule conditions to be examined sequentially and only trigger those rules where the conditions are met, etc.

It will be appreciated that a call to an invokable module may be performed using one or more "payloads" that include the above-described and/or other information in different example embodiments. Furthermore, it will be appreciated that the information need not necessarily be provided as header information in the one or more different payloads. For instance, in certain example embodiments, the header of a first message may include an indication of the module to be invoked and/or the processing mode in which it should be invoked, while the body of the message includes facts, or indications of facts, to be used in such invocations. In other example embodiments, this information may be split over two or more different messages, e.g., depending on the amount of data to be transmitted, the expected format, etc.

Example

Figure 5:
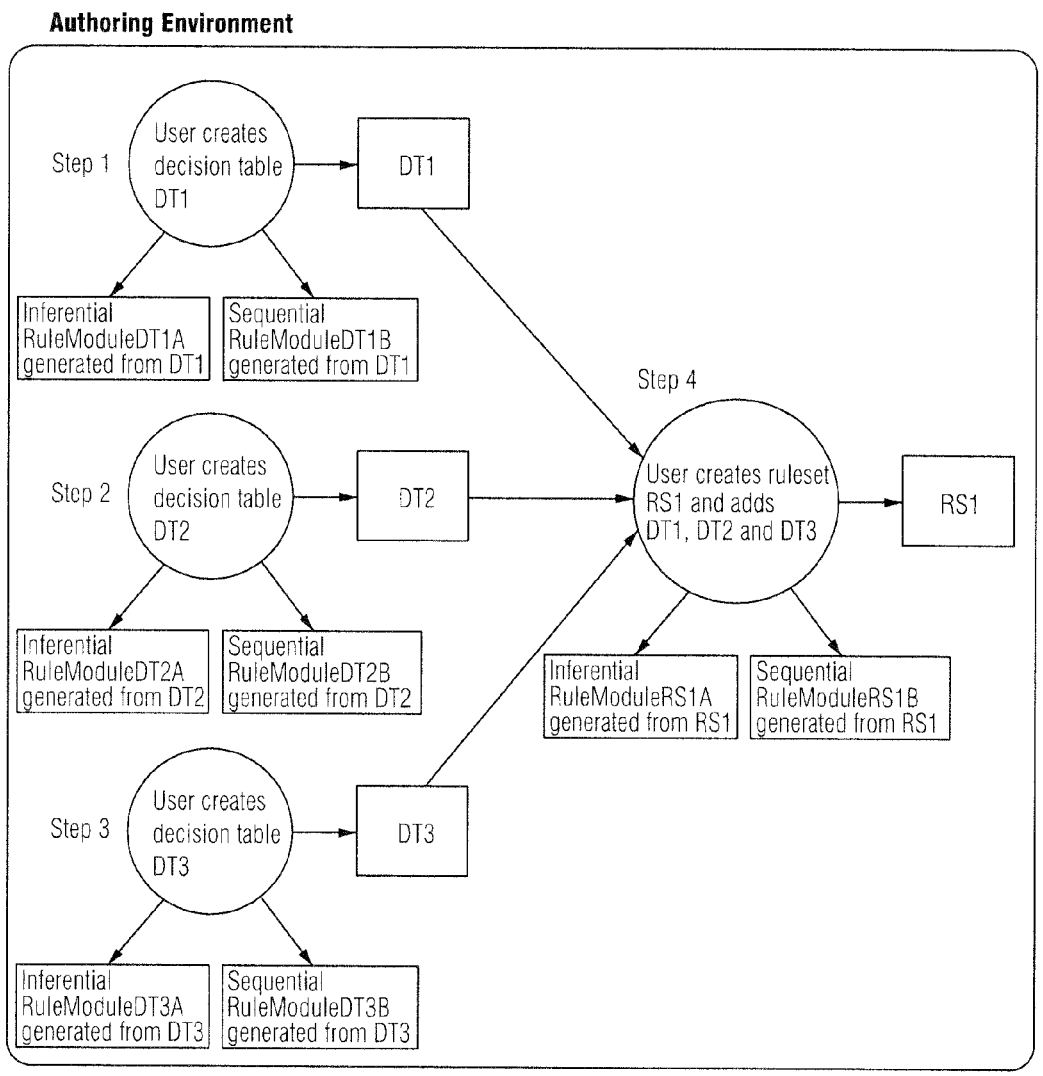
FIG. 5 shows an example authoring/design process in accordance with certain example embodiments.

An example of how the techniques of certain example embodiments can be used throughout an illustrative lifecycle will now be provided, e.g., in connection with FIGS. 5-11. For example, FIG. 5 shows an example authoring/design process in accordance with certain example embodiments. As shown in FIG. 5, the user creates three decision tables (DT1, DT2, and DT3). At the time the decision tables are created or modified, a process will generate corresponding rule modules. RuleModuleDT1A, RuleModuleDT2A, and RuleModuleDT3A all contain rules that are generated to handle inferential invocation, whereas RuleModuleDT1B, RuleModuleDT2B, and RuleModuleDT3B all contain rules that are generated to handle sequential invocation. The user does not need to be concerned with these underlying modules, and the authoring environment may in example implementations actually hide them from the user. It thus may be easier to help focus the user's attention on the decision tables and the authoring utility used to create them. It will be appreciated that the decision tables DT1, DT2, and DT3 may be created in series in certain example implementations, although this is not necessarily required the decision tables may be developed in parallel, spirally, etc.).

The user creates a ruleset RS1 and adds the decision tables created in the previous steps. As decision tables are added or removed from the ruleset RS1, RuleModuleRS1A and RuleModuleRS1B will be created from a process. The process may create a rule module that contains the rules for all of the decision entities that were placed in the ruleset. Like the previously mentioned process, RuleModuleRS1A will include rules that support inferential invocation and RuleModuleRS1B will include rules that support sequential invocation.

Figure 6:
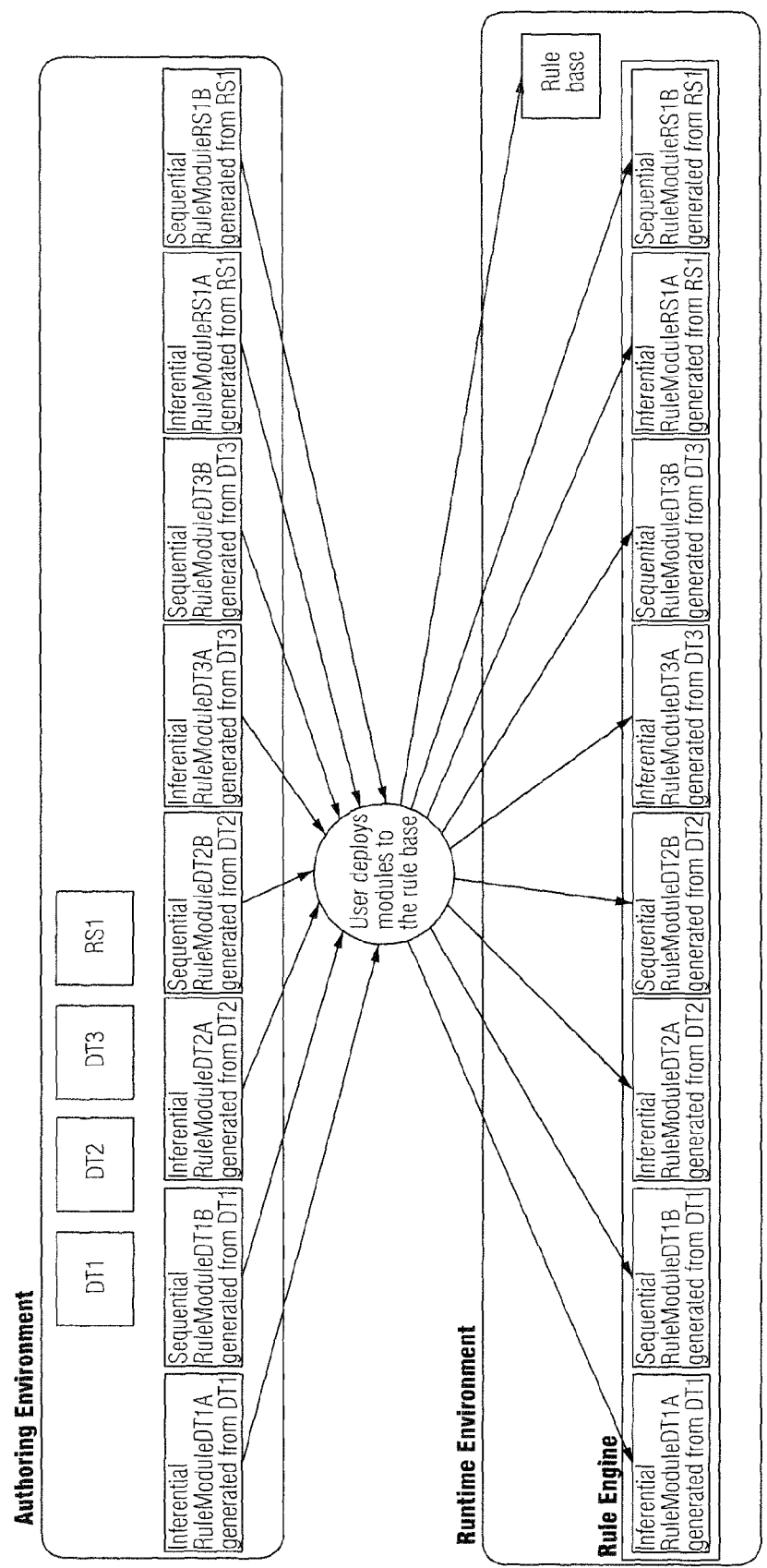
FIG. 6 shows the generated rule modules being deployed to the runtime environment in accordance with certain example embodiments.

When the user is ready, the rule modules may be deployed to the runtime environment. Deployment may place the rule modules into the rule engine, as well as into a rule base, e.g., as shown in FIG. 6. The rule base may be used to help place the modules into the rule engine upon restart. And similar to as noted above, the user does not need to be aware of all of these deployed modules. Instead, the user may simply select the decision table(s) and/or rulesets(s) that the user wishes to deploy. A process may then run to help copy the modules into the rule base of the runtime environment.

Once the rule modules have been deployed, external applications can invoke them. For instance, an external application may perform a call to the runtime environment and passes a payload. The call can be an HTTP request, a call to a web service, and/or some other request that takes the payload and passes it through to the invocation layer of the runtime environment. The payload may include the fact(s) required by the rule engine, along with some header information. The header information may include, for example, the name of the decision table or ruleset that is to be invoked, along with the processing mode. For the sequential processing mode, an additional header element can be passed to indicate how to handle the sequential processing. Such additional header information may include an indication that, for example, processing should stop when the first rule that satisfies its conditions is fired; all rules that satisfy the conditions should be fired; etc.

Figure 7:
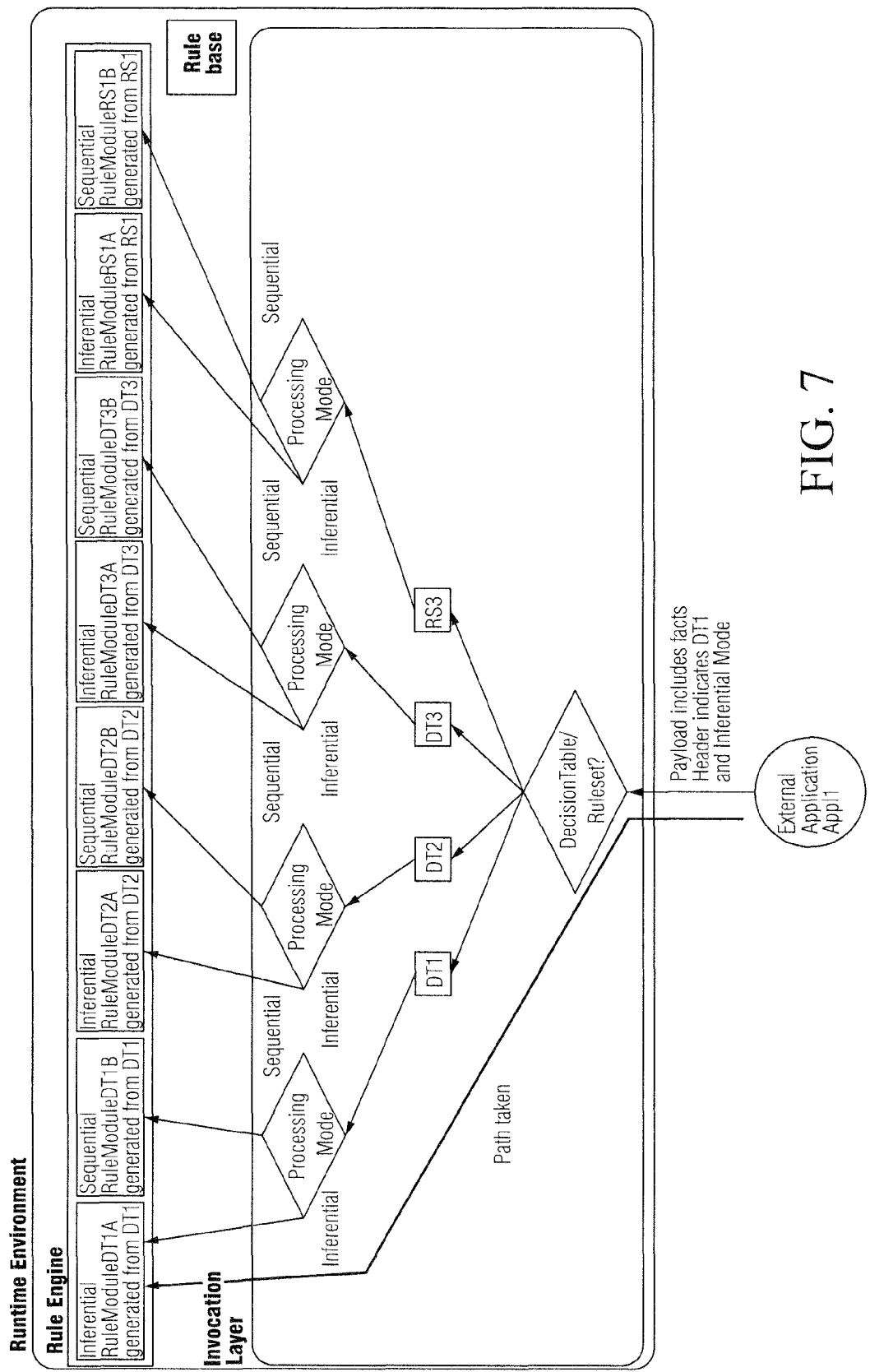
FIG. 7 shows how an external application can invoke a decision table inferentially in accordance with certain example embodiments.

FIG. 7 shows how an external application can invoke a decision table inferentially in accordance with certain example embodiments. In FIG. 7, the external application intends to invoke decision table DT1 inferentially. Thus, the external application may pass a payload including the facts that are to be asserted into the rule engine. The payload may, in turn, include header information including of the decision table name (DT1) and the processing mode, which is inferential, in this example.

Figure 8:
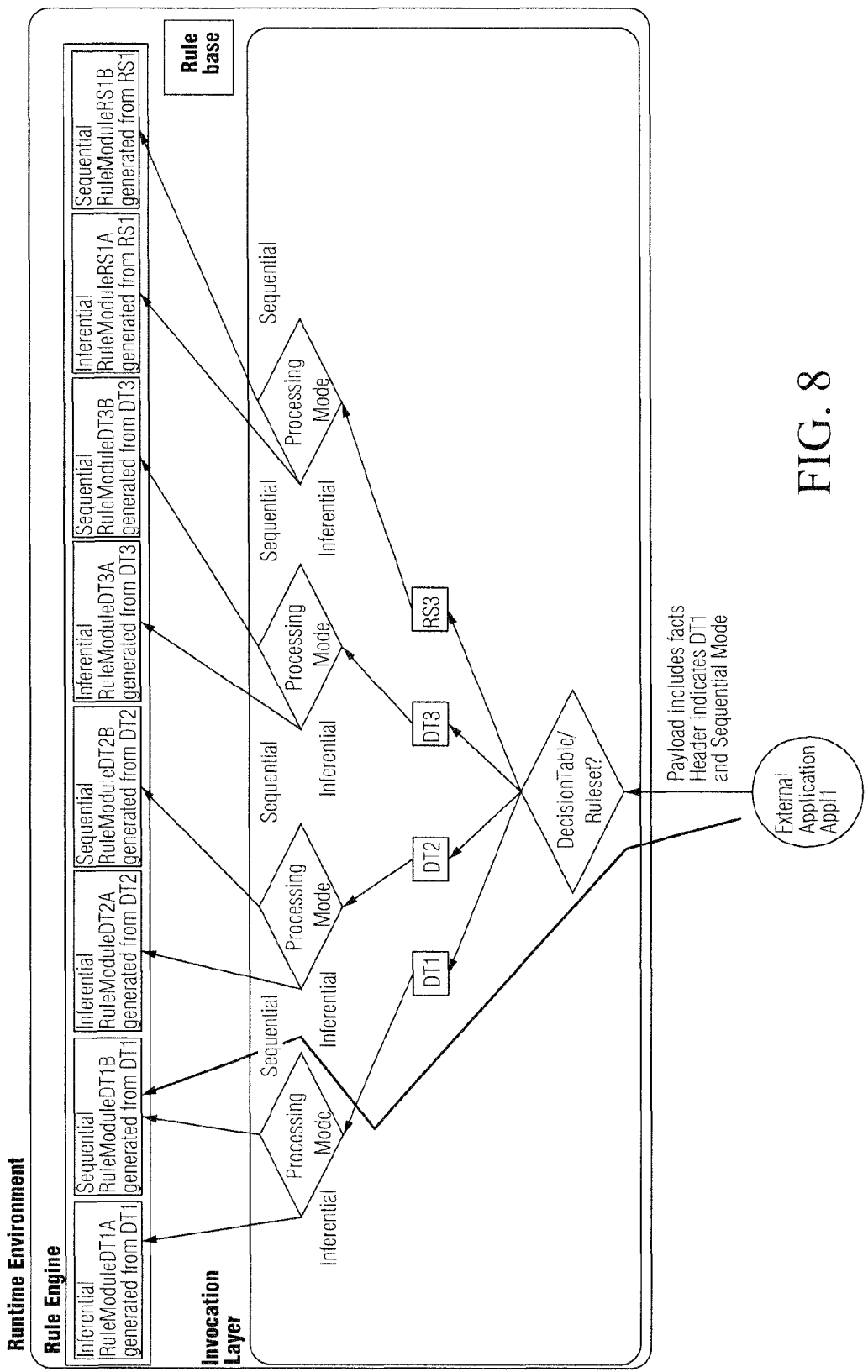
FIG. 8 shows how an external application can invoke a decision table sequentially in accordance with certain example embodiments.

FIG. 8 shows how an external application can invoke a decision table sequentially in accordance with certain example embodiments. In FIG. 8, the external application intends to invoke decision table DT1 sequentially. Thus, the external application may pass a payload including the facts that are to be asserted into the rule engine. The payload may, in turn, include header information including the decision table name (DT1) and the processing mode, which is sequential in this example.

Figure 9:
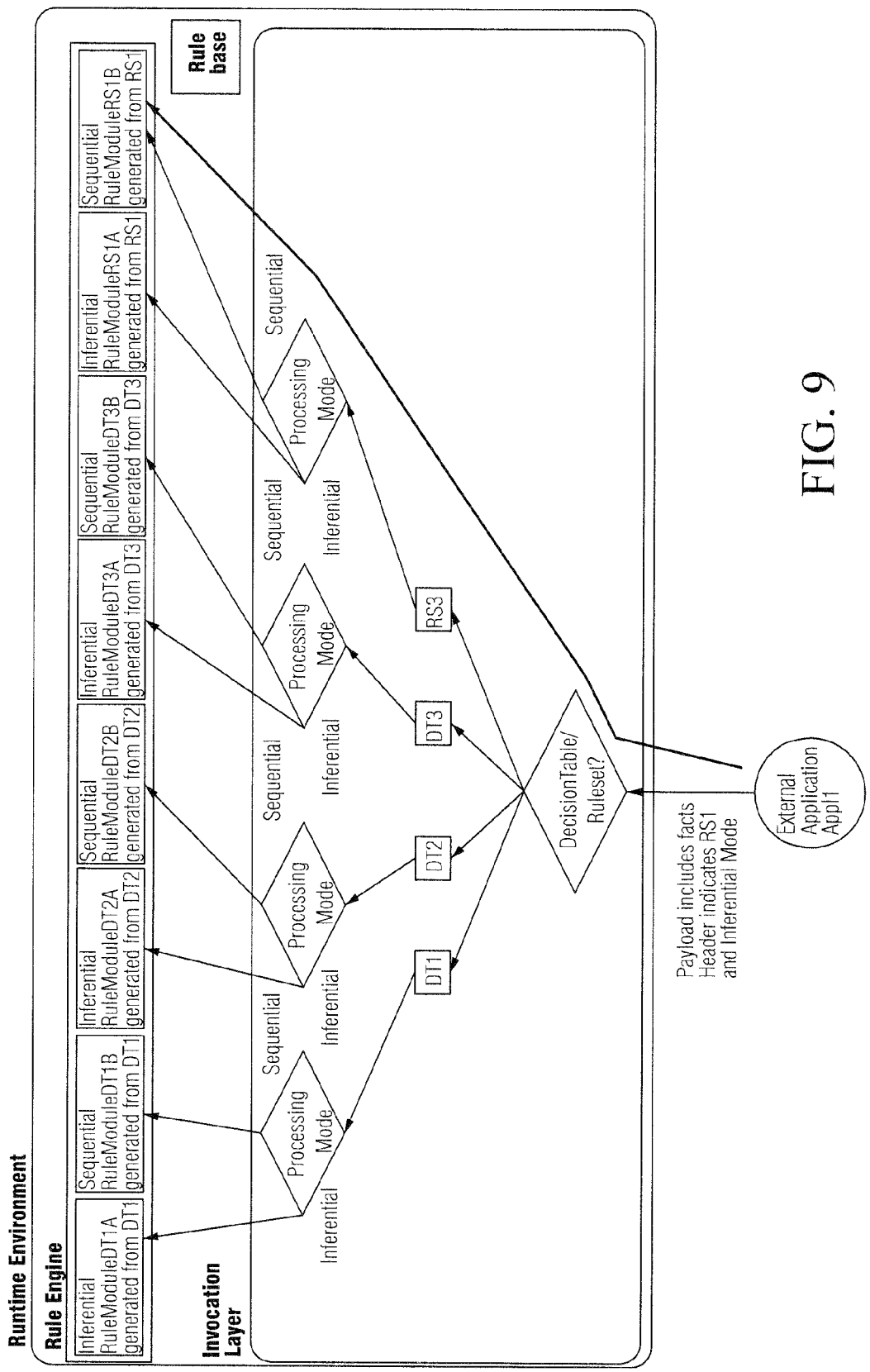
FIG. 9 shows how an external application can invoke a ruleset sequentially in accordance with certain example embodiments.

FIG. 9 shows how an external application can invoke a ruleset sequentially in accordance with certain example embodiments. In FIG. 9, the external application may pass a payload including the facts that are to be asserted into the rule engine. The payload may, in turn, include header information including the ruleset RS1, and the fact that the processing mode is to be sequential.

Certain example embodiments may enable parallel invocations, even where the invocations are of different types, e.g., because different sets of artifacts are created. This may be accomplished using, for example, rule engine frameworks that implement a pooling mechanism to handle parallel invocations. In certain example embodiments, different pools may be created for different processing types. For instance, a first pool may be provided for inferential processing rule engines, a second pool may be provided for sequential processing rule engines, etc. When an invocation arrives, a rule engine or rule engine instance may be retrieved from the pool and may be used to process the invocation. Because parallel invocations are processed by different rule engines or different rule engine instances, they may be insulated from one another. As a result, there may not be any interference between them. At the end of the invocation, the desired output may be returned to the caller, and the rule engine or rule engine instance may be returned to the pool.

Figure 10:
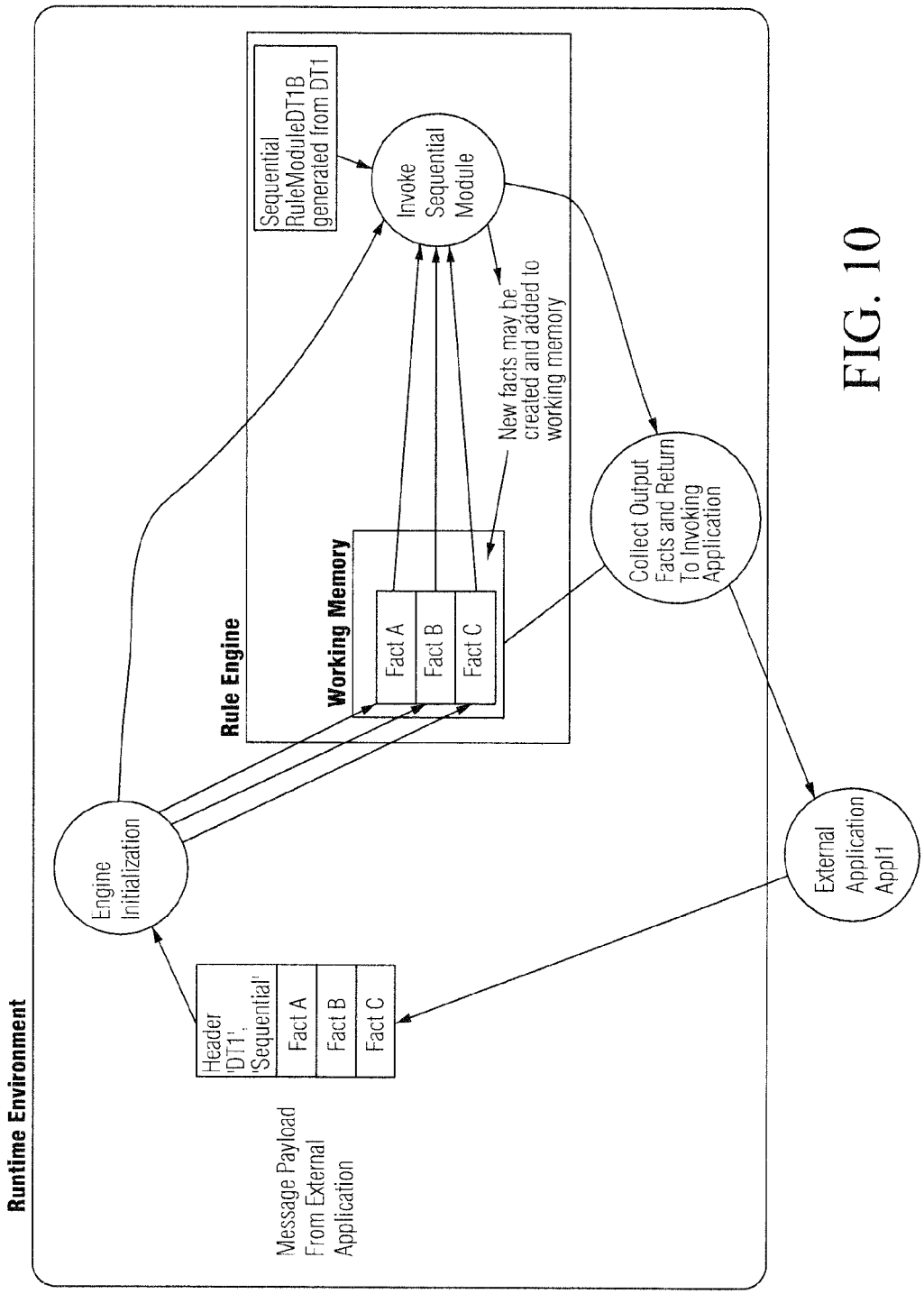
FIG. 10 illustrates how a sequential module may be processed within the rule engine, in accordance with certain example embodiments.

FIG. 10 illustrates how a sequential module may be processed within the rule engine, in accordance with certain example embodiments. In FIG. 10, the external application passes a message payload during invocation. As indicated above, the payload may pass the facts to be processed, along with header information indicating that the decision table DT1 is to be invoked sequentially. The facts are asserted into working memory, and the rule engine is initialized. The rule module RuleModuleDT1B is started as a result. As the module runs, it tests the facts against the conditions within the rules sequentially and fires any rules that satisfy the conditions. When running modules sequentially, the rule agenda is bypassed, e.g., to prevent rules from being reevaluated. The right hand side of the rules may assert new facts into the rule engine's working memory. When the rule module completes, the facts are collected from memory and sent back to the invoking application.

Figure 11:
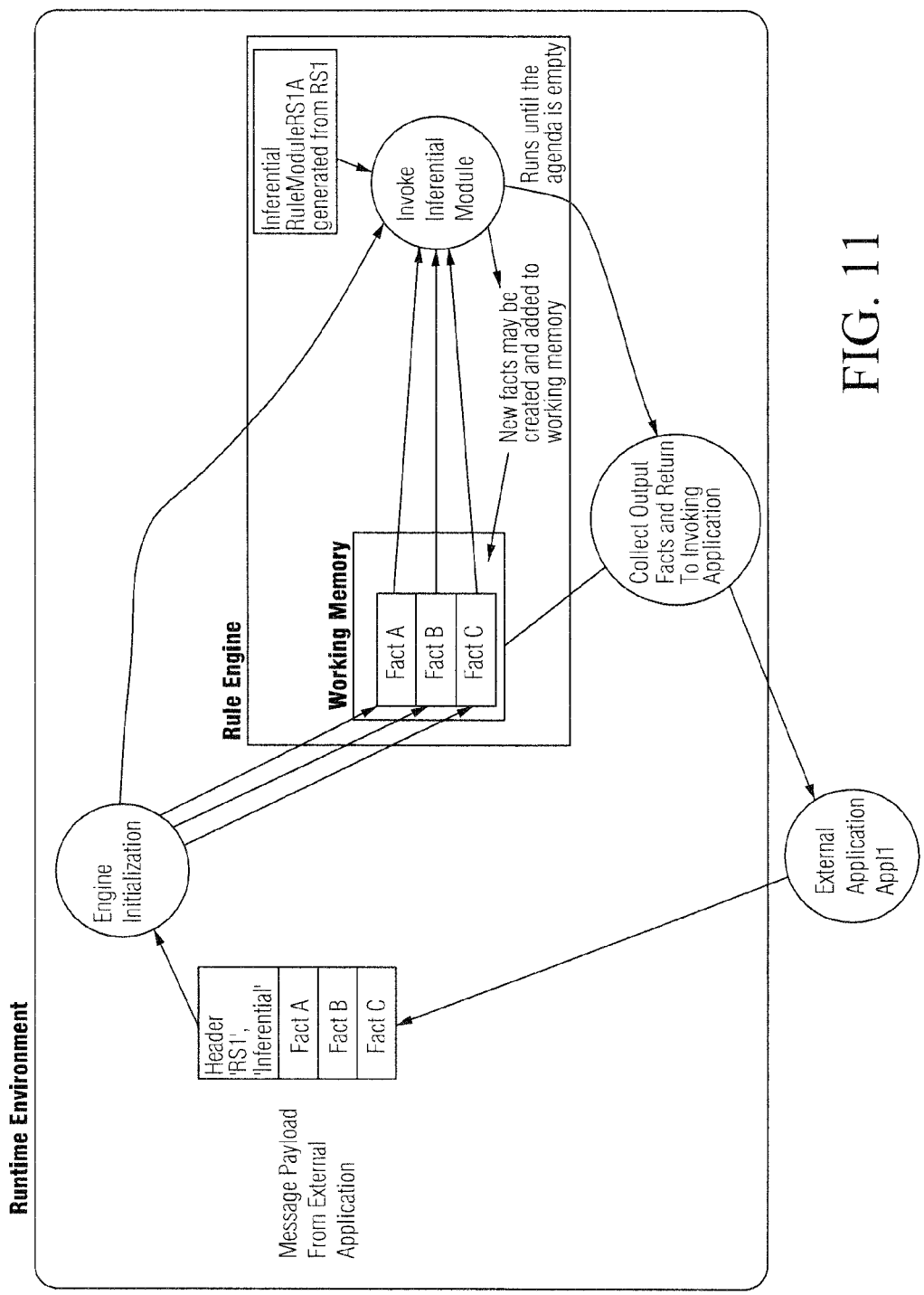
FIG. 11 shows how an inferential module is processed within the rule engine, in accordance with certain example embodiments.

FIG. 11 shows how an inferential module is processed within the rule engine, in accordance with certain example embodiments. In FIG. 11, the external application passes a message payload during invocation. As indicated above, the payload may pass the facts to be processed, along with header information indicating that the ruleset RS1 is to be invoked inferentially. The facts are asserted into working memory, and rule engine is initialized. The rule module RuleModuleRS1A is then started as a result. As the module runs, facts are evaluated by the rule conditions inferentially. When evaluating rules inferentially, the rule agenda is utilized, and when the right hand side of a rule changes the values within the facts, rules may be reevaluated and can potentially fire more than once. The right hand side of the rules may assert new facts into the rule engine's working memory. When the agenda is finally empty, the facts are collected from memory and sent back to the invoking application.

It will be appreciated from the above that certain example embodiments are able to select the type of business rule processing by a rules engine (e.g., inferential or sequential) at invocation time (runtime), rather than forcing the designer specify a particular mode at design time. This may in certain example implementations advantageously allow for different invocations (potentially from different applications) to decide on the type of processing of what are basically the same set of rules. It will be appreciated that once one can select processing modes at invocation time, it advantageously becomes possible for different applications to select different modes, and also that a single application may in some instances even switch modes for different invocations within the same application.

It will be appreciated that as used herein, the terms system, subsystem, service, programmed logic circuitry, and the like may be implemented as any suitable combination of software, hardware, firmware, and/or the like. It also will be appreciated that the storage locations herein may be any suitable combination of disk drive devices, memory locations, solid state drives, CD-ROMs, DVDs, tape backups, storage area network (SAN) systems, and/or any other appropriate transitory or non-transitory/tangible computer readable storage medium. It also will be appreciated that the techniques described herein may be accomplished by having at least one processor execute instructions that may be tangibly stored on a non-transitory computer readable storage medium.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of configuring a business rules management system (BRMS) including a business rule engine that executes one or more business rules in a runtime environment, the method comprising:
   receiving user input, in connection with a user interface operating on a computer, indicating that at least one rule metaphor is to be created, each said rule metaphor including a representation of a set of rules;
   generating, via at least one processor, at least two metaphor rule modules for each said rule metaphor, the metaphor rule modules for a given one rule metaphor respectively supporting different ways the set of rules represented therein can be invoked at runtime(s) of one or more applications;
   receiving user input, in connection with a or the user interface operating on a or the computer, indicating that at least one rule set is to be created, each said rule set being associated with at least one created rule metaphor;
   generating, via at least one processor, at least two rule set rule modules for the at least one rule set, the rule set rule modules for a given one rule set respectively supporting different ways that rule set can be invoked at runtime(s) of the one or more applications;
   the generated metaphor rule modules and rule set rule modules being deployable to a rule engine and a rule base in the runtime environment of the BRMS in order to enable their selective invocation by the one or more applications during the runtime(s) of the one or more applications; and
   the plurality of invokable metaphor rule modules and the plurality of invokable rule set rule modules having respective invocation types and being individually and selectively invokable in response to a request including an invocation type from an application to invoke at least one of the predefined set of rules or rule set used to generate the metaphor rule modules and the rule set rule modules.

2. The method of claim 1, wherein one or more of said one or more applications is or are, respectively, external to the runtime environment.

3. The method of claim 1, wherein the calling application specifies the type of invocation in a payload delivered from the calling application to an invocation layer of the runtime environment.

4. The method of claim 1, further comprising enabling a default invocation type to be set for each said metaphor or rule set.

5. The method of claim 1, wherein each said metaphor is a decision table or decision tree.

6. The method of claim 1, wherein the different ways the set of rules can be invoked at runtime include inferential and sequential invocations.

7. The method of claim 1, further comprising hiding the generated metaphor rule modules or rule set rule modules from users at design time.

8. The method of claim 1, wherein required invocation types for all created metaphors and rule sets are not specified at design time.

9. The method of claim 1, wherein receiving user input indicating that at least one rule metaphor is to be created, generating at least two metaphor rule modules for each said rule metaphor, receiving user input indicating that at least one rule set is to be created, and generating at least two rule set rule modules for the at least one rule set, are performed at design time.

10. The method of claim 9, wherein required invocation types for the generated metaphors and rule sets are unspecified at design time.

11. A method of operating a business rules management system (BRMS) including a business rule engine that is configured to execute one or more business rules in a runtime environment, the rule engine including plural invokable rule modules provided to handle different respective invocation types for an associated predefined rule module, the method comprising:
receiving, from an application communicating with the BRMS in the runtime environment, a request to invoke a predefined rule module stored in the rule engine, at least one fact or an indication of at least one fact that is needed by the rule engine in invoking the requested predefined rule module, and an indication of an invocation type for the requested predefined rule module;
selecting, during the runtime of the application, which rule module, from the plurality of invokable rules modules corresponding to the requested predefined rule module and stored in the rule engine, should be invoked based on the received request to invoke the predefined rule module and the received indication of the invocation type;
invoking, in connection with at least one processor of the BRMS, the selected invokable rule module to execute one or more rules associated with the selected invokable rule module using the at least one fact or the indication of at least one fact received from the application; and
transmitting an output representing a result of execution of the one or more rules from the rule engine to the application.

12. The method of claim 11, wherein the application is external to the runtime environment and communalization therebetween is practiced over a network connection.

13. The method of claim 11, wherein the invokable modules or correspond to rule metaphors including representations of sets of rules or rule sets associated with one or more rule metaphors.

14. The method of claim 11, wherein each said metaphor is a decision table or decision tree.

15. The method of claim 11, wherein the request from the application is received as a call to the runtime environment.

16. The method of claim 15, wherein the call is an HTTP request or a web service call that is passed through an invocation layer of the runtime environment.

17. The method of claim 15, wherein the call includes all facts or indications of all facts needed by the rule engine in invoking the requested predefined rule module.

18. The method of claim 15, wherein the call identifies a rule set or metaphor to be invoked.

19. The method of claim 15, wherein the invocation type is specified as being either sequential or inferential.

20. The method of claim 15, wherein when the invocation type is specified as being sequential, the call further includes an indication that either (a) processing is to stop when the first rule that satisfies conditions associated with the invoked rule module is triggered, or (b) all rules that satisfy the conditions are to be triggered.

21. The method of claim 11, further comprising interpreting an empty or non-specified indication of the invocation type for the requested predefined rule module as being an indication that a preset default invocation type is to be used.

22. The method of claim 11, further comprising enabling the invokable rule module, once invoked, to assert new facts.

23. The method of claim 11, wherein the invokable rule modules are stored to a non-transitory computer readable storage medium that is located in the runtime environment and is in communication with the rule engine.

24. The method of claim 23, further comprising placing modules from the medium into the rule engine upon rule engine restart.

25. The method of claim 11, further comprising supporting parallel invocations in connection with a pooling mechanism.

26. The method of claim 11, wherein no invocation types for any created rule modules are specified at design time.

27. A non-transitory computer readable storage medium tangibly storing instructions for configuring a business rules management system (BRMS) including a business rule engine that executes one or more business rules in a runtime environment by at least performing the method according to claim 1.

28. A non-transitory computer readable storage medium tangibly storing instructions for operating a business rules management system (BRMS) including a business rule engine that is configured to execute one or more business rules in a runtime environment by at least performing the method according to claim 11.

29. A computer system for configuring a business rules management system (BRMS) including a business rule engine that executes one or more business rules in a runtime environment, comprising:
a user interface configured to receive user input indicating that (a) at least one rule metaphor is to be created, each said rule metaphor including a representation of a set of rules, and (b) at least one rule set is to be created, each said rule set being associated with at least one created rule metaphor; and
at least one processor configured to generate:
at least two metaphor rule modules for each said rule metaphor, the metaphor rule modules for a given one rule metaphor respectively supporting different ways the set of rules represented therein can be invoked at runtime(s) of one or more applications, and
at least two rule set rule modules for the at least one rule set, the rule set rule modules for a given one rule set respectively supporting different ways that rule set can be invoked at runtime(s) of the one or more applications;
the generated metaphor rule modules and rule set rule modules being deployable to a rule engine and a rule base in the runtime environment of the BRMS in order to enable their selective invocation by one or more applications during the runtime(s) of the one or more applications; and
the plurality of invokable metaphor rule modules and the plurality of invokable rule set rule modules having respective invocation types and being individually and selectively invokable in response to a request including an invocation type from an application to invoke at least one of the predefined set of rules or rule set used to generate the metaphor rule modules and the rule set rule modules.

30. The computer system of claim 29, wherein the at least two metaphor rule modules for each said rule metaphor and the at least two rule set rule modules for the at least one rule set are generated at design time.

31. The computer system of claim 30, wherein required invocation types for the generated metaphors and rule sets are unspecified at design time.

32. A business rules management system (BRMS), comprising:
   processing resources including at least one processor and a memory;
   a business rule engine that is configured to execute, in connection with the processing resources, one or more business rules in a runtime environment, the rule engine including plural invokable rule modules provided to handle different respective invocation types for an associated predefined rule module; and
   a network interface configured to receive, from an application in communicating with the BRMS in the runtime environment, a request to invoke a predefined rule module stored in the rule engine, at least one fact or an indication of at least one fact that is needed by the rule engine in invoking the requested predefined rule module, and an indication of an invocation type for the requested predefined rule module;
   wherein the processing resources are configured to at least:
      select, during the runtime of the application, which rule module, from the plurality of invokable rules modules corresponding to the requested predefined rule module and stored in the business rule engine, should be invoked based on the received request to invoke the predefined rule module and the received indication of the invocation type;
      invoke the selected invokable rule module to execute one or more rules associated a with the selected invokable rule module using the at least one fact or the indication of at least one fact received from the application; and
      cause output representing a result of execution of the one or more rules from the rule engine to be transmitted to the application over the network interface.

* * * * *